(12) United States Patent
Wobben

(10) Patent No.: US 7,795,751 B2
(45) Date of Patent: Sep. 14, 2010

(54) WIND POWER INSTALLATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/476,360

(22) PCT Filed: Apr. 12, 2002

(86) PCT No.: PCT/EP02/04108

§ 371 (c)(1),
(2), (4) Date: Apr. 15, 2004

(87) PCT Pub. No.: WO02/090769

PCT Pub. Date: Nov. 14, 2002

(65) Prior Publication Data

US 2004/0169375 A1 Sep. 2, 2004

(30) Foreign Application Priority Data

| May 3, 2001 | (DE) | 101 21 647 |
| Jun. 12, 2001 | (DE) | 101 28 438 |

(51) Int. Cl.
*F03D 9/00* (2006.01)
*H02P 9/04* (2006.01)

(52) U.S. Cl. ......................................................... 290/55
(58) Field of Classification Search .................... 290/55
See application file for complete search history.

(56) References Cited

U.S. PATENT DOCUMENTS

| 1,233,232 | A | * | 7/1917 | Heyroth | 290/55 |
| 1,944,239 | A | * | 1/1934 | Honnef | 290/55 |
| 2,240,262 | A | | 4/1941 | Honnef et al. | 172/237 |
| 3,395,296 | A | | 7/1968 | Cohen | 310/51 |
| 3,644,066 | A | * | 2/1972 | Heob et al. | 417/354 |
| 3,918,839 | A | * | 11/1975 | Blackwell et al. | 416/175 |
| 4,075,500 | A | * | 2/1978 | Oman et al. | 290/55 |
| 4,140,433 | A | * | 2/1979 | Eckel | 415/209.1 |
| 4,197,055 | A | * | 4/1980 | Campbell | 416/119 |
| 4,204,799 | A | * | 5/1980 | de Geus | 415/4.5 |
| 4,221,546 | A | * | 9/1980 | Papst et al. | 417/354 |
| 4,247,253 | A | * | 1/1981 | Seki et al. | 416/44 |
| 4,255,085 | A | * | 3/1981 | Evans | 416/197 A |
| 4,256,435 | A | * | 3/1981 | Eckel | 415/209.1 |
| 4,274,809 | A | * | 6/1981 | Delgado et al. | 416/117 |

(Continued)

FOREIGN PATENT DOCUMENTS

DE 27 08 411 8/1978

(Continued)

*Primary Examiner*—T C Patel
*Assistant Examiner*—Pedro J Cuevas
(74) *Attorney, Agent, or Firm*—Seed Intellectual Property Law Group PLLC

(57) ABSTRACT

The present invention concerns a wind power installation having a support structure for the stator of a ring generator, wherein the support structure has a plurality of support arms. The object of the present invention is to reduce the sound emissions emanating from a wind power installation as set forth in the classifying portion of the claim. A wind power installation having a generator, preferably a ring generator, comprising a rotor and a stator which has a mounting means for stator windings, wherein the stator is held by a support structure which has a plurality of support arms and wherein an odd number of support arms are provided and/or the support arms are irregularly spaced.

20 Claims, 6 Drawing Sheets

U.S. PATENT DOCUMENTS

| | | | | |
|---|---|---|---|---|
| 4,285,636 A * | 8/1981 | Kato et al. | | 416/197 A |
| 4,289,970 A * | 9/1981 | Deibert | | 290/44 |
| 4,324,985 A * | 4/1982 | Oman | | 290/55 |
| 4,415,312 A * | 11/1983 | Brenneman | | 416/119 |
| 4,452,568 A * | 6/1984 | Andersson | | 416/119 |
| 4,482,302 A * | 11/1984 | Grignon | | 417/354 |
| 4,494,007 A * | 1/1985 | Gaston | | 290/44 |
| 4,691,133 A * | 9/1987 | Mongeau | | 310/178 |
| 4,720,640 A * | 1/1988 | Anderson et al. | | 290/43 |
| 4,850,258 A | 7/1989 | Hoshino et al. | | 84/413 |
| 4,979,871 A * | 12/1990 | Reiner | | 415/4.2 |
| 5,028,216 A * | 7/1991 | Harmsen et al. | | 417/354 |
| 5,460,485 A * | 10/1995 | Sugiyama et al. | | 415/208.2 |
| 5,466,120 A * | 11/1995 | Takeuchi et al. | | 415/119 |
| 5,518,367 A * | 5/1996 | Verastegui | | 416/119 |
| 5,577,888 A * | 11/1996 | Capdevila et al. | | 415/210.1 |
| 5,783,894 A * | 7/1998 | Wither | | 310/266 |
| 5,844,341 A | 12/1998 | Spooner et al. | | 310/112 |
| 6,017,191 A * | 1/2000 | Harmsen | | 416/247 R |
| 6,064,123 A * | 5/2000 | Gislason | | 290/55 |
| 6,139,265 A * | 10/2000 | Alizadeh | | 415/208.1 |
| 6,142,733 A * | 11/2000 | Alizadeh et al. | | 415/208.2 |
| 6,371,730 B1 * | 4/2002 | Wobben | | 416/244 R |
| 6,379,115 B1 * | 4/2002 | Hirai | | 416/17 |
| 6,452,287 B1 * | 9/2002 | Looker | | 290/55 |
| 6,485,857 B2 | 11/2002 | Perry et al. | | 429/34 |
| 6,494,430 B2 * | 12/2002 | Takakura | | 248/603 |
| 6,561,762 B1 * | 5/2003 | Horng et al. | | 415/211.2 |
| 6,694,828 B1 * | 2/2004 | Nicot | | 73/862.326 |
| 6,803,671 B1 | 10/2004 | Wobben | | 290/55 |
| 6,833,633 B2 * | 12/2004 | Wobben | | 290/55 |
| 6,836,028 B2 * | 12/2004 | Northrup et al. | | 290/44 |
| 6,841,892 B1 * | 1/2005 | Le Nabour et al. | | 290/43 |
| 6,849,965 B2 * | 2/2005 | Le Nabour et al. | | 290/55 |
| 6,913,435 B2 * | 7/2005 | Seki | | 415/4.1 |
| 6,930,416 B1 * | 8/2005 | Remington et al. | | 310/51 |
| 7,040,858 B2 * | 5/2006 | Suzuki | | 415/4.2 |
| 2004/0101398 A1 * | 5/2004 | Wobben | | 415/4.1 |
| 2005/0084373 A1 * | 4/2005 | Suzuki | | 416/132 B |

FOREIGN PATENT DOCUMENTS

| | | | |
|---|---|---|---|
| DE | 694 01 241 T2 | | 5/1997 |
| DE | 197 47 742 A1 | | 5/1998 |
| DE | 695 02 560 T2 | | 9/1998 |
| DE | 19711869 A1 | * | 9/1998 |
| DE | 197 29 034 A1 | | 1/1999 |
| DE | 100 33 233 A1 | | 1/2002 |
| FR | 766 642 | | 4/1934 |
| GB | 2292191 A | * | 2/1996 |
| JP | H1-9246 | | 3/1989 |
| JP | 3098445 | | 4/1991 |
| JP | 3101157 U | | 10/1991 |
| JP | 3102067 U | | 10/1991 |
| JP | 553541 U | | 7/1993 |
| JP | 9051648 A | | 2/1997 |
| JP | 2000023417 A | | 1/2000 |
| JP | 2000197392 | | 7/2000 |
| JP | 2001289149 A | | 10/2001 |
| JP | 3911479 B2 | | 2/2007 |
| WO | 0074210 A1 | | 12/2000 |

* cited by examiner

WIND POWER INSTALLATION

TECHNICAL FIELD

The present invention concerns a wind power installation having a support structure for the stator of a ring generator, wherein the support structure has a plurality of support arms.

BACKGROUND OF THE INVENTION

Wind power installations have long been known and are produced and marketed for example by Enercon under the type designations E-40, E-58 or E-56.

Operation of such wind power installations always involves the production of sound emissions which can be perceived to be disturbing, at least in the area relatively closely around the wind power installation.

SUMMARY OF THE INVENTION

Therefore the object of at least some embodiments of the present invention is to reduce the sound emissions emanating from a wind power installation as set forth herein. That object is attained by a wind power installation having features disclosed herein.

While in the case of a support structure with an even number of support arms which can develop given frequencies uniformly in the peripheral direction of the ring generator, which are then perceived as sound waves that are experienced as being a disturbance, such sound emissions are entirely suppressed or reduced when the structure involves an odd number of support arms and/or irregular spacing of the support arms.

BRIEF DESCRIPTION OF THE FIGURES

The invention will be described in greater detail with reference to the drawings in which.

DETAILED DESCRIPTION OF THE INVENTION

Figure 1:
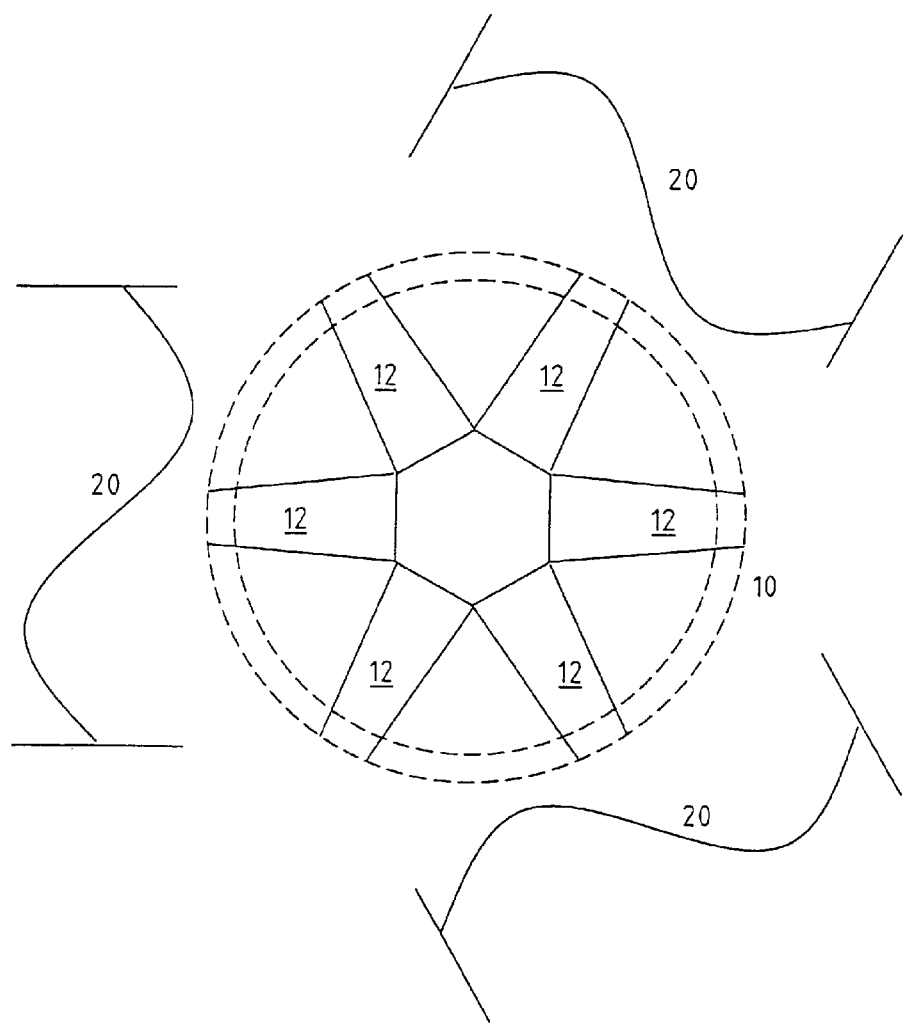
FIG. 1 shows a simplified view of a conventional support structure of the prior art.

FIG. 1 shows a support structure having six radially extending support arms 12, the outer portions of which are arranged at an equal spacing relative to each other. The stator 10 of a ring generator is fixed to those outer portions. The stator 10 is indicated in FIG. 1 by broken lines.

Figure 5:
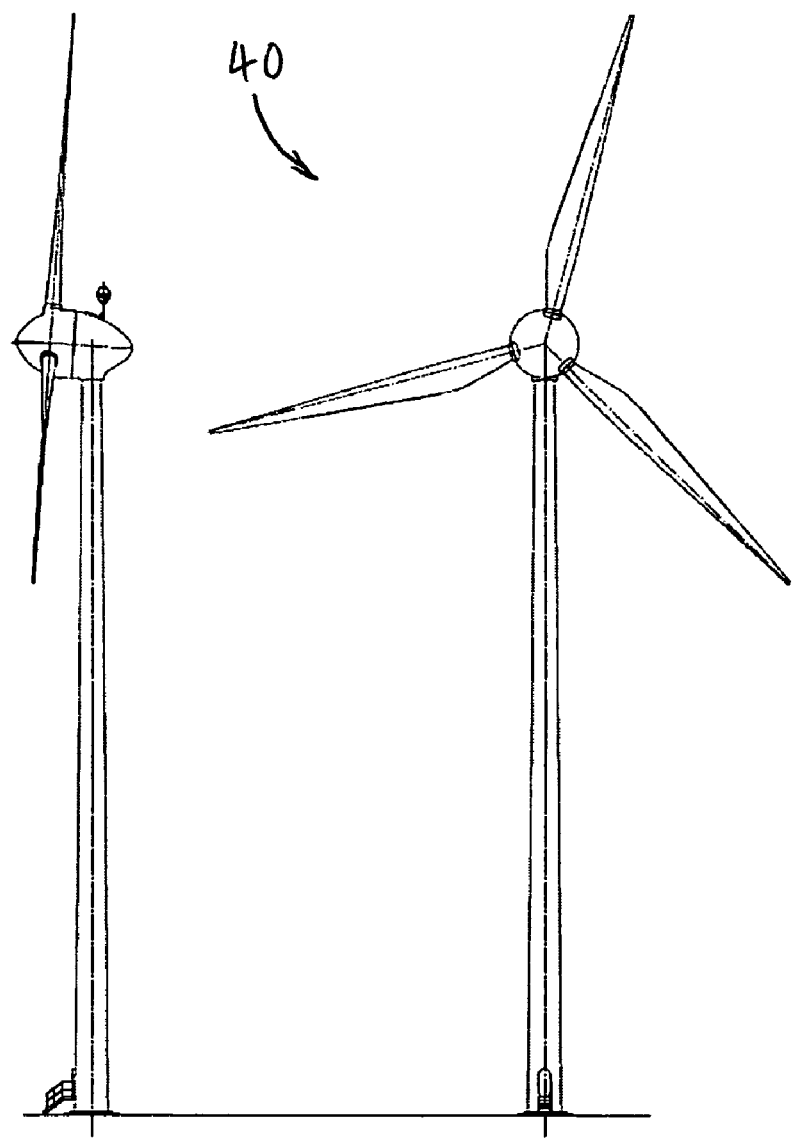
FIG. 5 shows an example wind power installation.

The support structure having six radially extending support arms 12 and the stator 10 of the ring generator of FIG. 1 can be installed in a wind power installation 40 of FIG. 5, such as the wind power installations provided by Enercon as previously described above.

Figure 6:
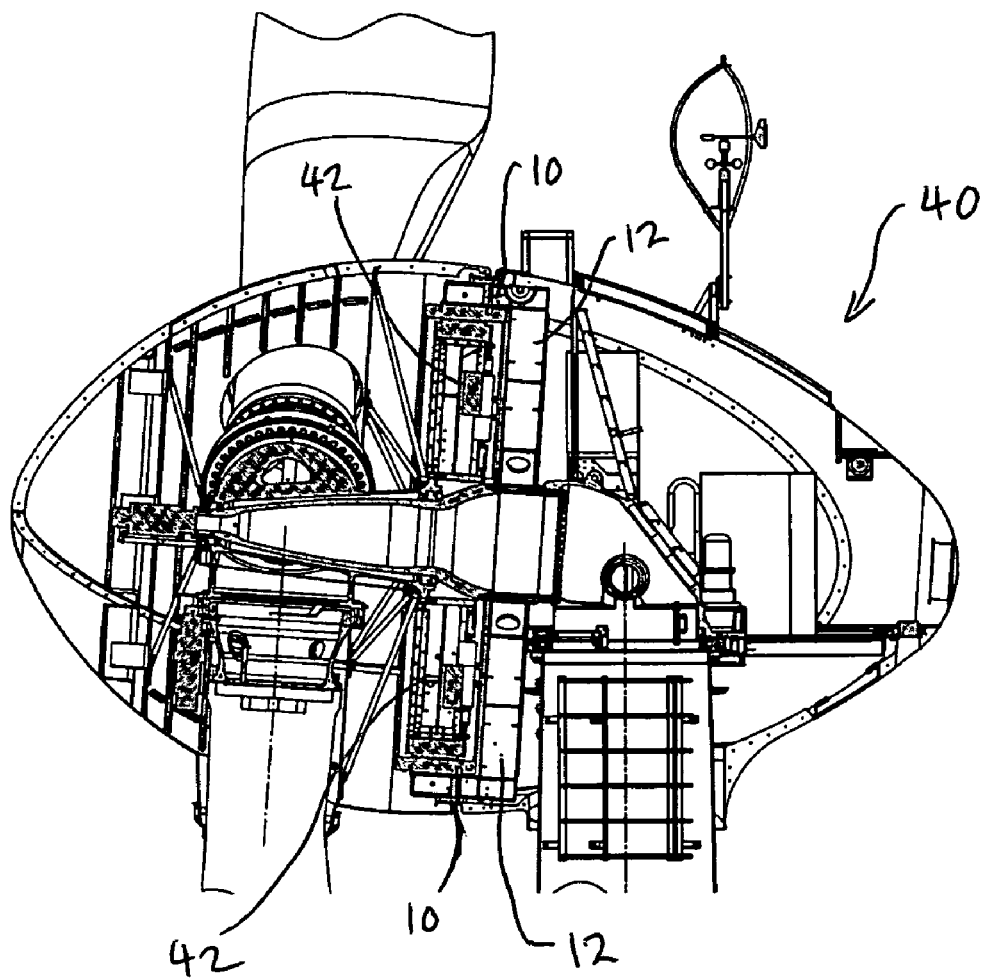
FIG. 6 shows internal components of the wind power installation of FIG. 5 in more detail.

FIG. 6 shows the internal components of the wind power installation 40 in more detail. Specifically and as described above, the stator 10 is affixed to the outer portions of the radially extending support arms of the support structure (shown as a side view in FIG. 6). The stator 10 forms part of a generator that also includes a rotor 42.

With this design configuration of a support structure, oscillations 20 can be formed distributed over the periphery between the support arms 12. The uniform spacing between the support arms 12 and the wavelength of the oscillations 20, which respectively coincides therewith, can give rise to an effect which is referred to as the 'drum effect'. What is more crucial in terms of sound emission however are the formation of natural modes (natural forms) which can be produced upon excitation with a given oscillation. Those natural modes are usually dependent on or determined by the geometry of the overall object.

Figure 2:
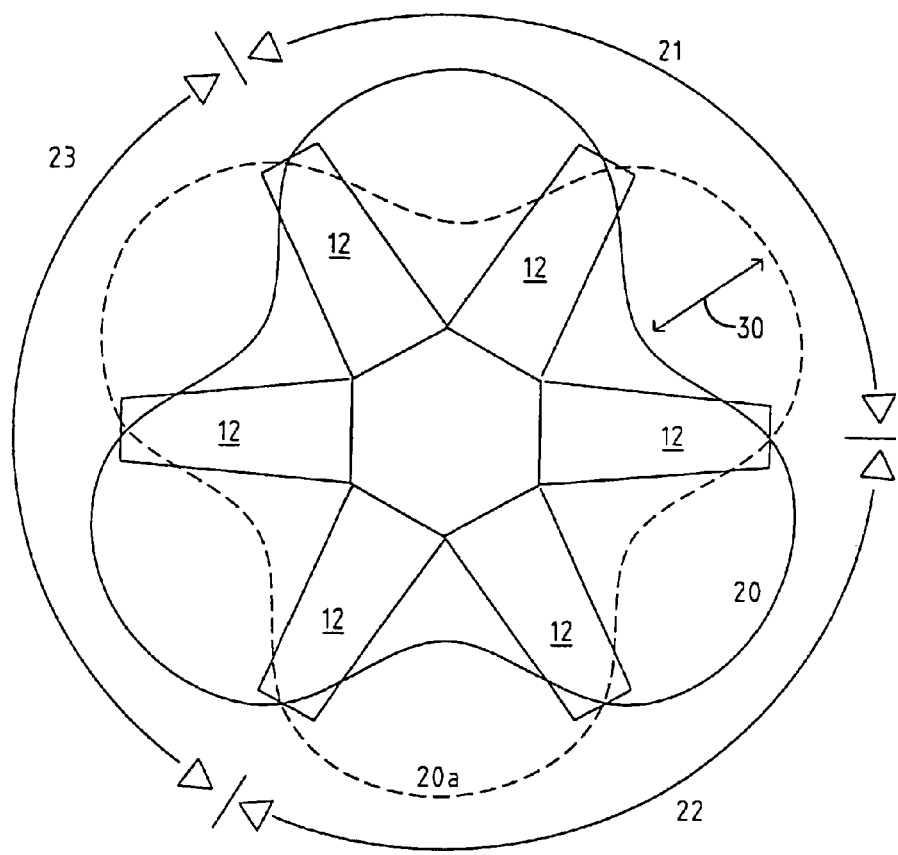
FIG. 2 shows an alternative configuration of the conventional support structure of the prior art.

FIG. 2 is an alternative view showing the situation in the case of the known support structure. In FIG. 2, the oscillations 20 are shown in conjunction over the periphery of the support structure with the support arms 12. The oscillations are shown by a dotted line displaced by half a period, and identified by reference numeral 20a.

If any point on the periphery of the support structure (or a molecule of air at that location) is considered, it will be seen that there, depending on the respective phase position of the oscillations 20, 20a, the position thereof alters along a line indicated by the arrow 30 in FIG. 2. Therefore for that point here there is a bidirectional oscillation, as in the case of an eardrum.

FIG. 2 shows three complete periods of an oscillation, distributed over the periphery of the arrangement, so that three respective in-phase points are always oscillating with the same magnitude and in the same direction. Those oscillations result in a regular 'pump movement' in the stator of the generator, which is perceived as sound.

Figure 3:
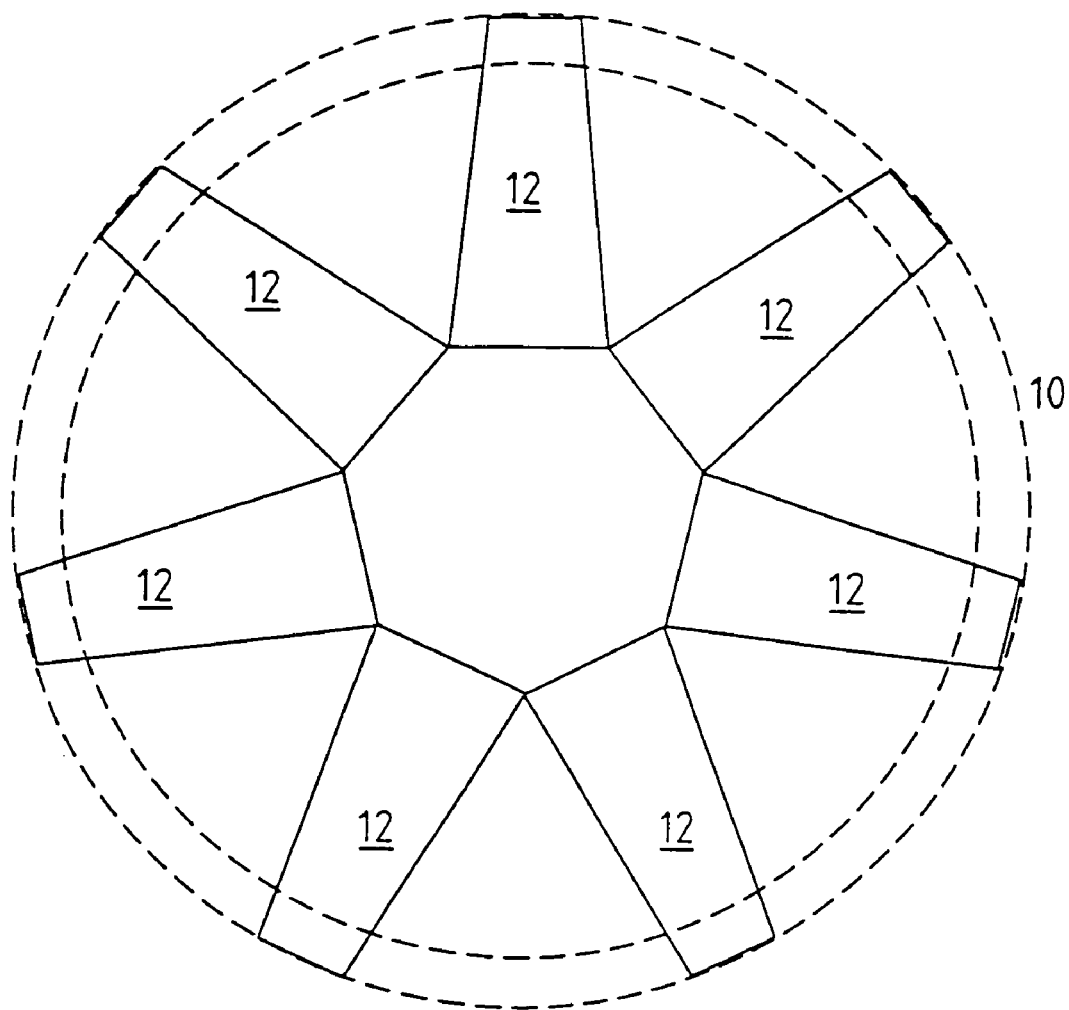
FIG. 3 shows an embodiment of a support structure according to the invention.

FIG. 3 shows in simplified form a support structure according to the invention. It has an odd number of support arms 12 (in this case seven), unlike the support arms previously described above with reference to FIGS. 1-2 that have an even number of support arms. It will be appreciated that the object of the present invention can also be attained with five support arms. In a preferred embodiment, at least seven support arms 12 are used for reasons of the required strength of the support structure. In FIG. 3, the stator 10 of the ring generator is again indicated by broken lines, and was previously described and shown above with regards to FIGS. 1-2 and 5-6.

Figure 4:
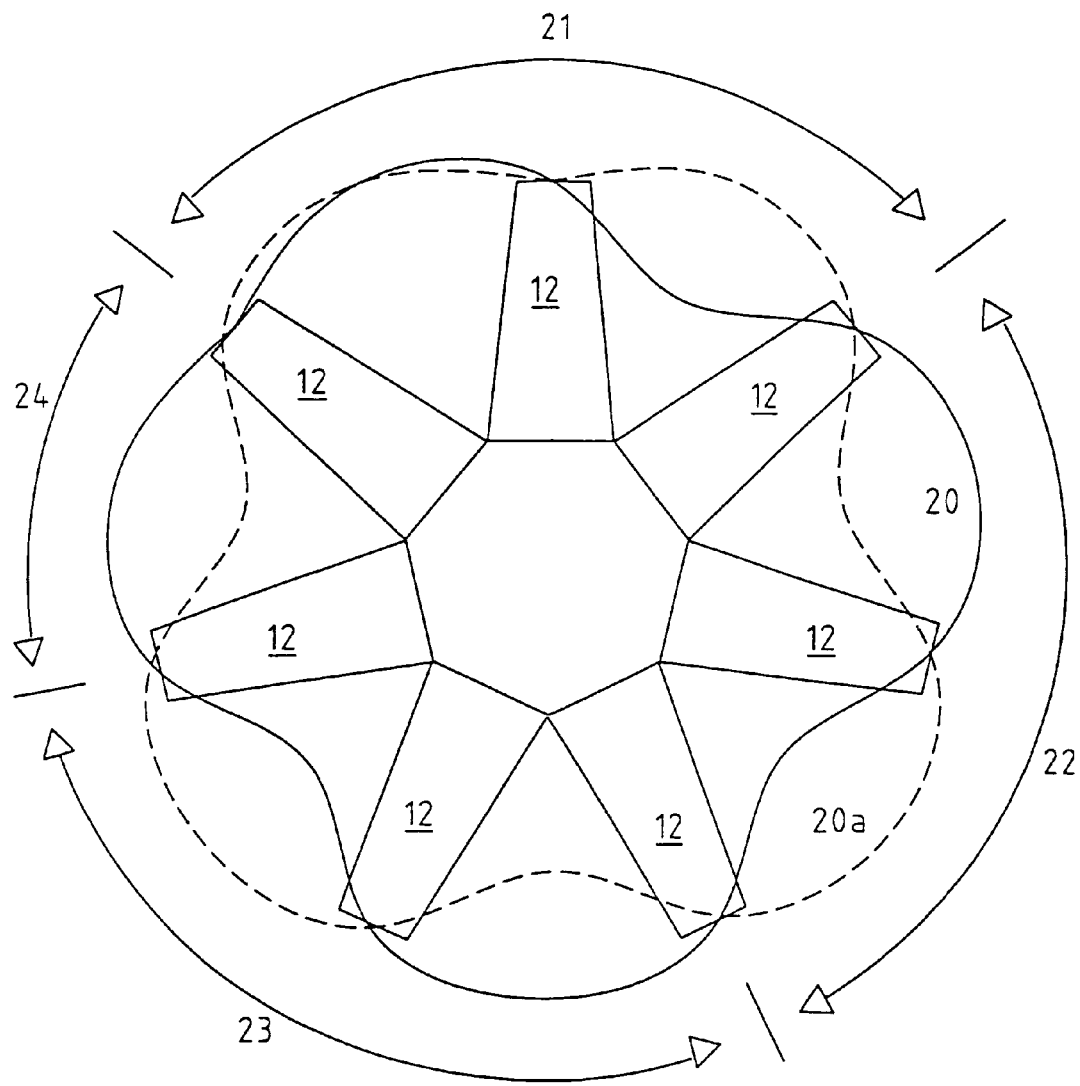
FIG. 4 shows an alternative view of the conditions of the embodiment according to the invention as shown in FIG. 3.

FIG. 4, similarly to FIG. 2, shows a representation of the oscillations which are linked together over the periphery of the support structure. In this case, once again a sequence of oscillation events is identified by reference numeral 20 while reference numeral 20a also represents those oscillation events but displaced by half a period with respect to the oscillations identified by reference numeral 20.

The oscillations identified by reference numeral 20 show three complete oscillation periods in the portions 21, 22 and 23 while only half a period occurs in the portion 24.

By virtue of that oscillation pattern, two positive half-waves (half-periods) are directly mutually adjacent, more specifically at the beginning of the portion 21 and in the portion 24, so that accordingly the drum effect cannot occur at least at that location and is thus at least reduced in its overall effect.

If a mechanical construction such as for example the support structure of a generator produces an unwanted sound emission, that can usually be explained on the basis that, under the action of oscillations, the entire support structure produces so-called resonances or also 'natural modes' (natural forms). Those 'natural modes' are firstly dependent on the geometry of the entire object, in addition there is also a certain frequency dependency of various natural modes.

With the design configuration according to the invention of the support arms 12 of the stator 10, the frequency pattern of that component is such that frequencies at which in particular sound-emitting natural modes (natural forms) could occur are avoided as much as possible.

The invention claimed is:

1. A wind power installation, comprising:
 a wind power installation generator having a rotor and a stator which has a mounting for stator windings;
 a support structure to hold said stator, wherein said support structure has a plurality of support arms coupled to said stator and wherein an odd number of all of said support arms of said support structure support the weight of the stator, wherein said odd number of support arms are sufficiently stiff and arranged to rigidly hold respective sections of the stator to reduce sound emission that is dependent on geometry of the support structure, and further wherein all of said odd number support arms to support said stator lie in a vertical plane; and
 wherein said support arms, to support said stator of said wind power installation generator, are irregularly spaced, all of said support arms extend radially from a common region, and wherein said stator of said wind power installation generator that is supported by said support arms is fixed to outer portions of all of said radially extending support arms, said outer portions being at opposite ends of said support arms relative to said common region.

2. The wind power installation according to claim 1 wherein the support structure for the stator has only seven of said support arms to support said stator of said wind power installation generator.

3. The wind power installation of claim 1 wherein the generator comprises a ring generator.

4. The wind power installation of claim 1 wherein said support arms are configured to develop a first oscillation pattern and a second oscillation pattern at a periphery of said support structure, said periphery being located proximate to said outer portions of said radially extending support arms,
 wherein said support arms are configured to develop a bi-directional oscillation between said first and second oscillation patterns, at a first portion of said periphery between a first pair of consecutive support arms, and
 wherein said odd number is selected so that said support arms are configured to said reduce said sound emission by reduction of said bi-directional oscillation between said first and second oscillation patterns, at one or more second portions of said periphery between at least one other pair of consecutive support arms.

5. The wind power installation of claim 1 wherein said odd number of all of said support arms comprises at least five odd numbered support arms.

6. The wind power installation of claim 1, wherein a first portion of the stator extending between a first support arm and an adjacent second support arm oscillates a distance that is substantially less than a distance of oscillation of a second portion of the stator extending between the second support arm and a third support arm adjacent to the second support arm.

7. A wind power installation, comprising:
 a wind power installation generator having a rotor and a stator which has a mounting for stator windings;
 a support structure to hold said stator, wherein said support structure has a plurality of support arms coupled to said stator, a number of all of said support arms of said support structure being an odd number such that the support arms have strength to support said stator and to substantially prevent bi-directional oscillation of a portion of the stator extending between two of the support arms to produce substantially no or only slight sound-emitting natural modes that are dependent on geometry of the support structure, wherein all of said odd number support arms to support said stator lie in a vertical plane; and
 wherein all of said support arms extend radially from a common region, and wherein said stator is fixed to outer portions of all of said radially extending support arms, said outer portions being at opposite ends of said support arms relative to said common region.

8. The wind power installation of claim 7 wherein said odd number of support arms comprises only seven of said support arms to support said stator of said wind power installation generator.

9. The wind power installation of claim 7 wherein spacing of the support arms, to support said stator of said wind power installation generator, is irregular.

10. The wind power installation of claim 7 wherein the generator comprises a ring generator.

11. The wind power installation of claim 7 wherein said support arms are configured to develop a first oscillation pattern and a second oscillation pattern at a periphery of said support structure, said periphery being located proximate to said outer portions of said radially extending support arms,
 wherein said support arms are configured to develop a bi-directional oscillation between said first and second oscillation patterns, at a first portion of said periphery between a first pair of consecutive support arms, and
 wherein said odd number is selected so that said support arms are configured to reduce sound emission by reduction of said bi-directional oscillation between said first and second oscillation patterns, at one or more second portions of said periphery between at least one other pair of consecutive support arms.

12. The wind power installation of claim 7 wherein said odd number of all of said support arms comprises at least five odd numbered support arms.

13. The wind power installation of claim 7, wherein the a first portion of the stator extending between a first support arm and a second support arm oscillates a distance that is substantially less than a distance of oscillation of a second portion of the stator extending between the second support arm and a third support arm adjacent to the second support arm.

14. An apparatus for a wind power installation, the apparatus comprising:
 a generator of said wind power installation;
 a rotor included with the generator;
 a stator included with the generator and having a mounting structure for stator windings;
 a support structure coupled to the stator to hold the stator, the support structure having a plurality of support arms coupled to said stator, a number of all of the support arms of said support structure being an odd number, wherein said odd number of support arms support the stator and are sufficiently stiff and arranged to rigidly hold respective sections of the stator to reduce sound, emitted from around a periphery of the support structure, that is dependent on geometry of the support structure, wherein all of said odd number support arms to support said stator lie in a vertical plane; and
 wherein all of said support arms extend radially from a common region, and wherein said stator is fixed to outer portions of all of said radially extending support arms, said outer portions being at opposite ends of said support arms relative to said common region.

15. The apparatus of claim 14 wherein said odd number of support arms comprises at least seven odd-numbered support arms to support said stator of said generator of said wind power installation.

16. The apparatus of claim 15 wherein the number of support arms comprises only seven of said support arms to support said stator of said generator of said wind power installation.

17. The apparatus of claim 14 wherein spacing of the support arms, to support said stator of said generator of said wind power installation, is irregular.

18. The apparatus of claim 14 wherein said support arms are configured to develop a first oscillation pattern and a second oscillation pattern at a periphery of said support structure, said periphery being located proximate to said outer portions of said radially extending support arms,
- wherein said support arms are configured to develop a bi-directional oscillation between said first and second oscillation patterns, at a first portion of said periphery between a first pair of consecutive support arms, and
- wherein said odd number is selected so that said support arms are configured to said reduce said emitted sound by reduction of said bi-directional oscillation between said first and second oscillation patterns, at one or more second portions of said periphery between at least one other pair of consecutive support arms.

19. A wind power installation, comprising:
- a wind power installation generator having a rotor and a stator which has a mounting for stator windings; and
- a support structure to hold said stator, wherein said support structure has a plurality of support arms coupled to said stator, a number of all of said support arms of said support structure being an odd number that is selected so that said support structure produces substantially no or only slight sound-emitting natural modes that are dependent on geometry of the support structure,
- wherein all of said odd number support arms to support said stator lie in a vertical plane,
- wherein all of said odd number support arms extend radially from a common region, and wherein said stator is fixed to outer portions of all of said radially extending odd number support arms, said outer portions being at opposite ends of all of said odd number support arms relative to said common region, and
- wherein said odd number of all of said support arms that lie in said vertical plane is selected to support a size and weight of said stator fixed to said outer portions.

20. The wind power installation of claim 19 wherein said odd number of support arms comprises only seven of said support arms to support said stator of said wind power installation generator.

* * * * *